Dec. 30, 1958   P. C. HOLTE   2,866,230
CORRUGATED RUBBER TUBING AND ITS PRODUCTION
Filed Feb. 24, 1956   13 Sheets-Sheet 1

Inventor:
Paul C. Holte,
by Abbott Spear
Attorney

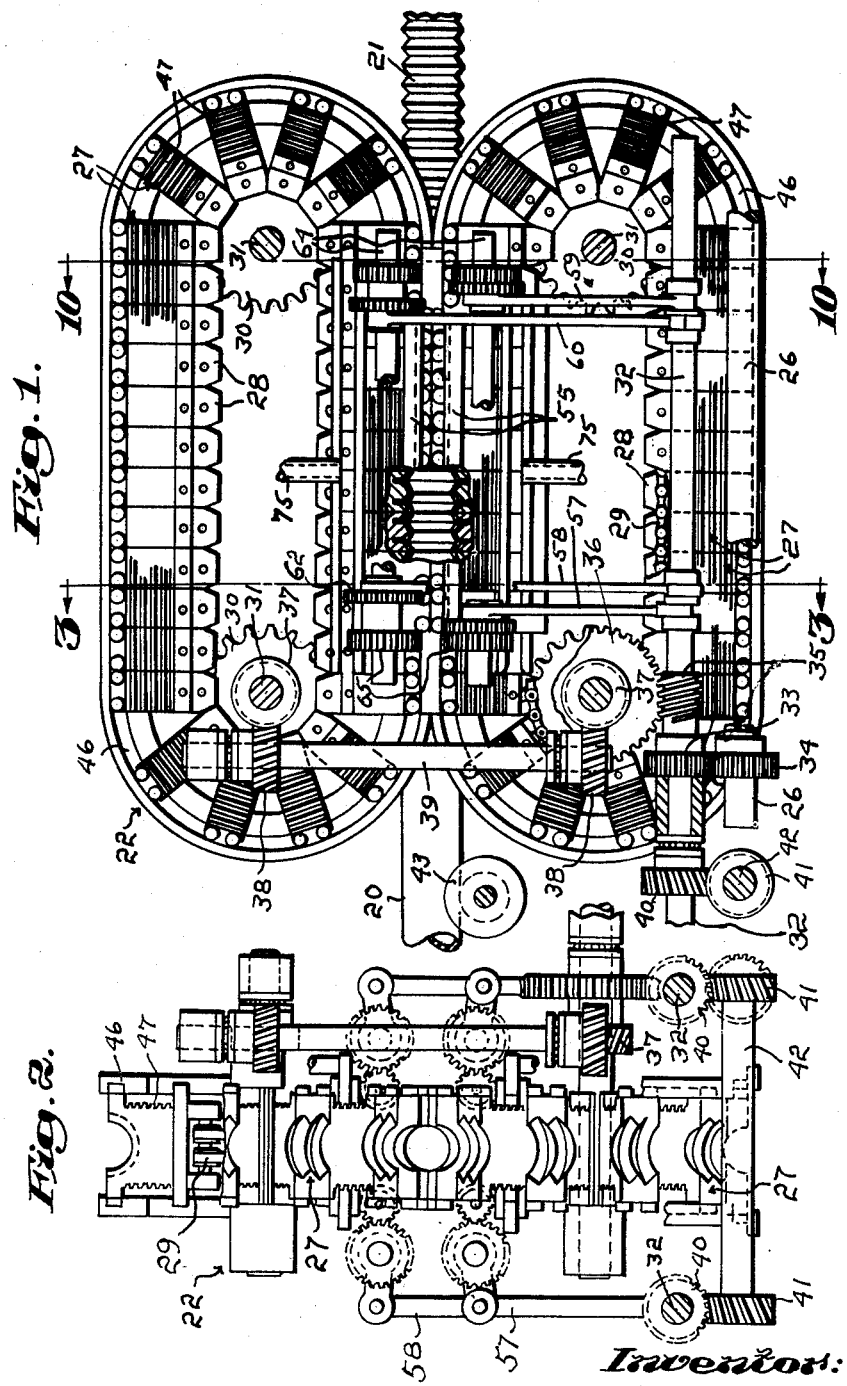

Dec. 30, 1958 P. C. HOLTE 2,866,230
CORRUGATED RUBBER TUBING AND ITS PRODUCTION
Filed Feb. 24, 1956 13 Sheets-Sheet 3
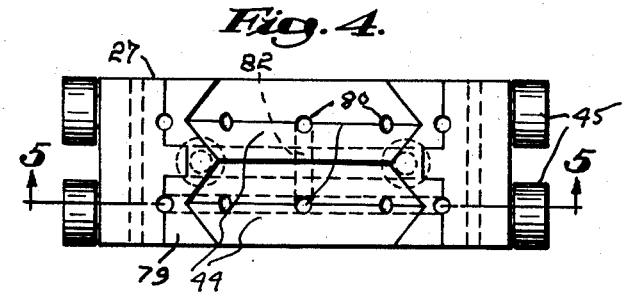
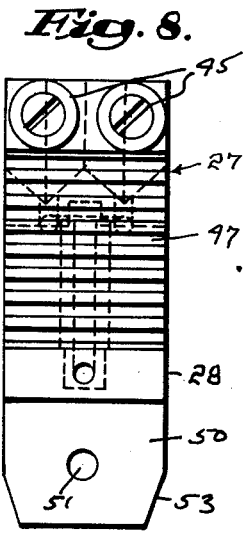
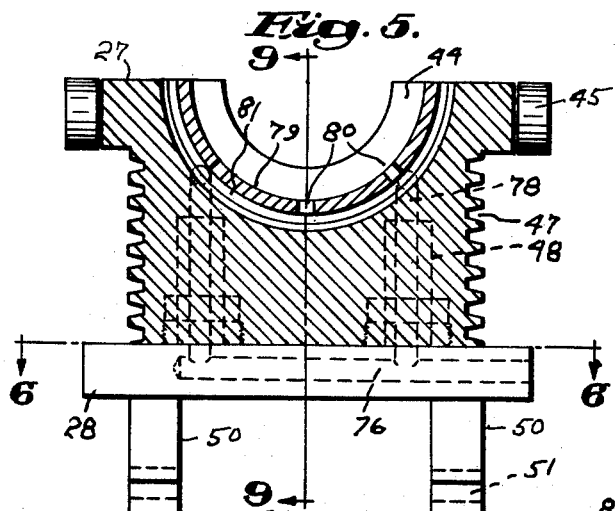
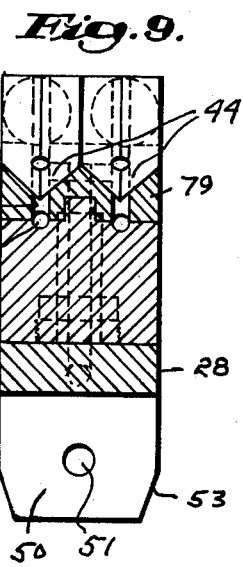
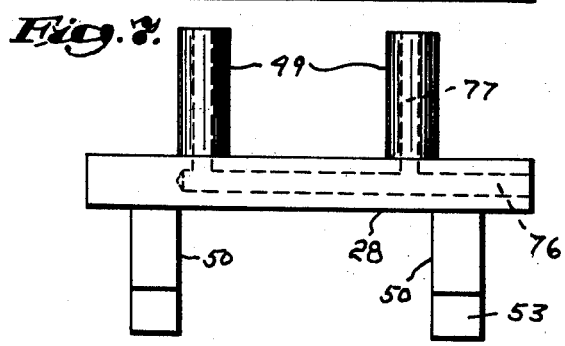
Inventor:
Paul C. Holte,
by [Attorney signature]
Attorney

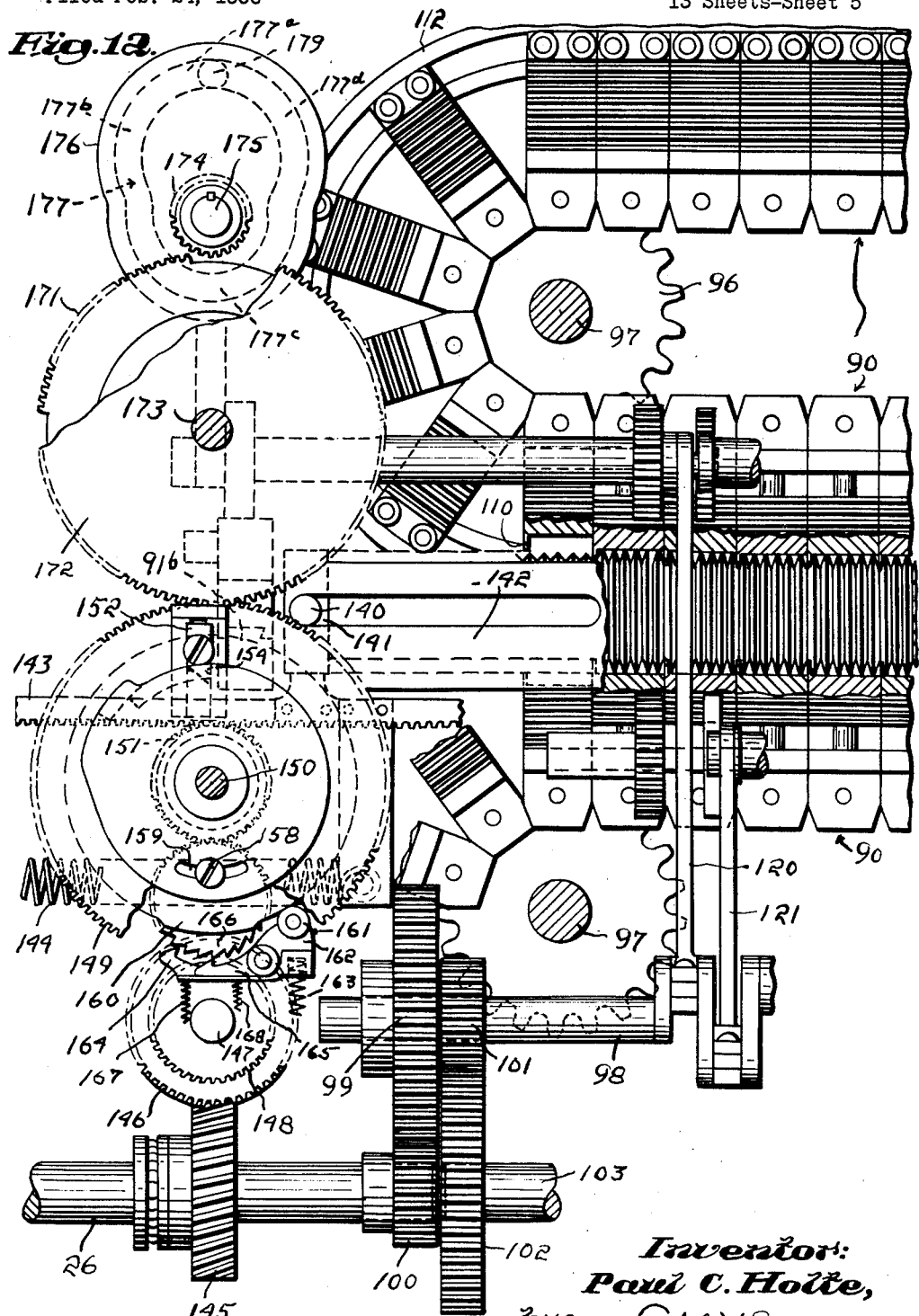

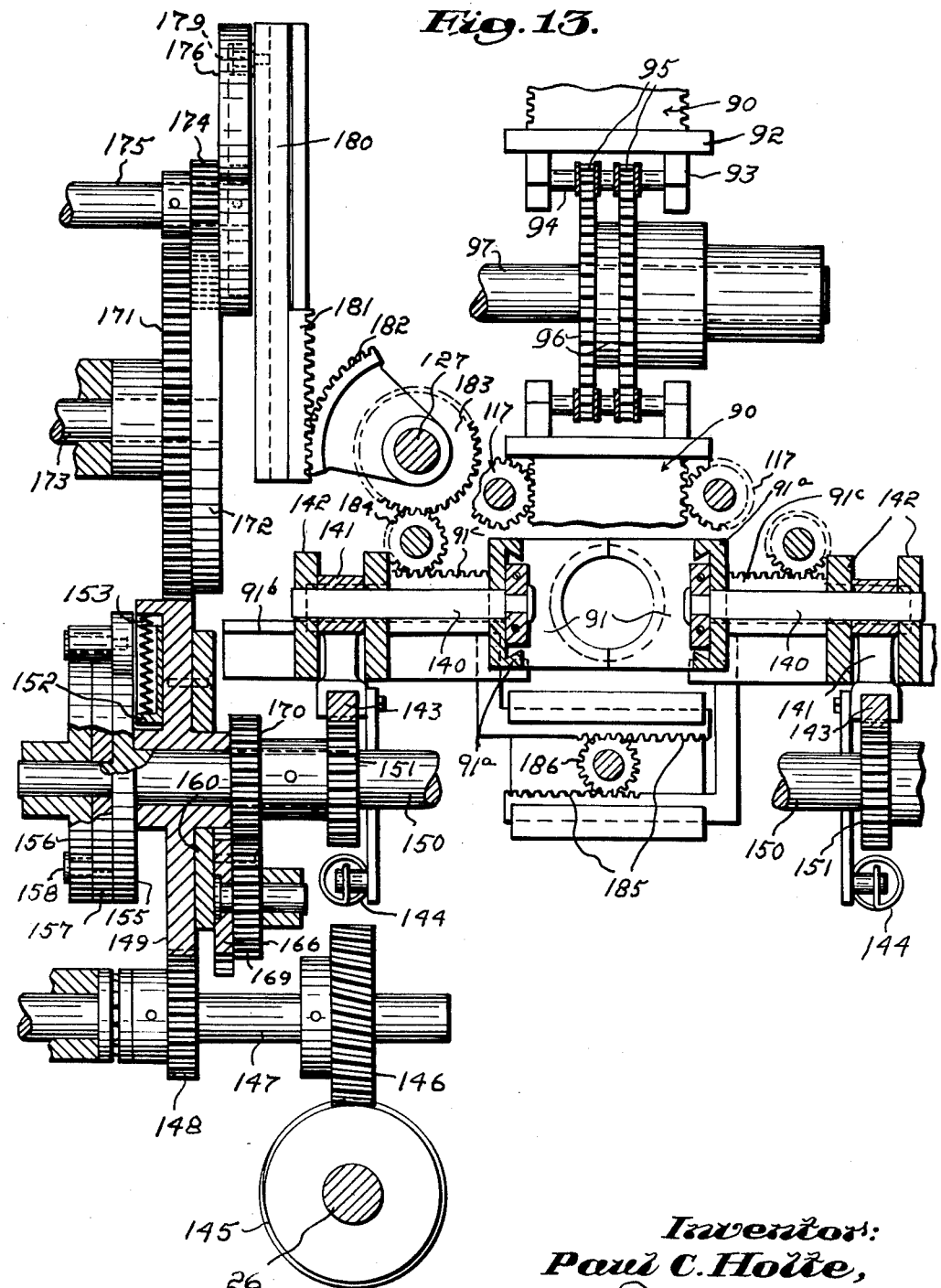

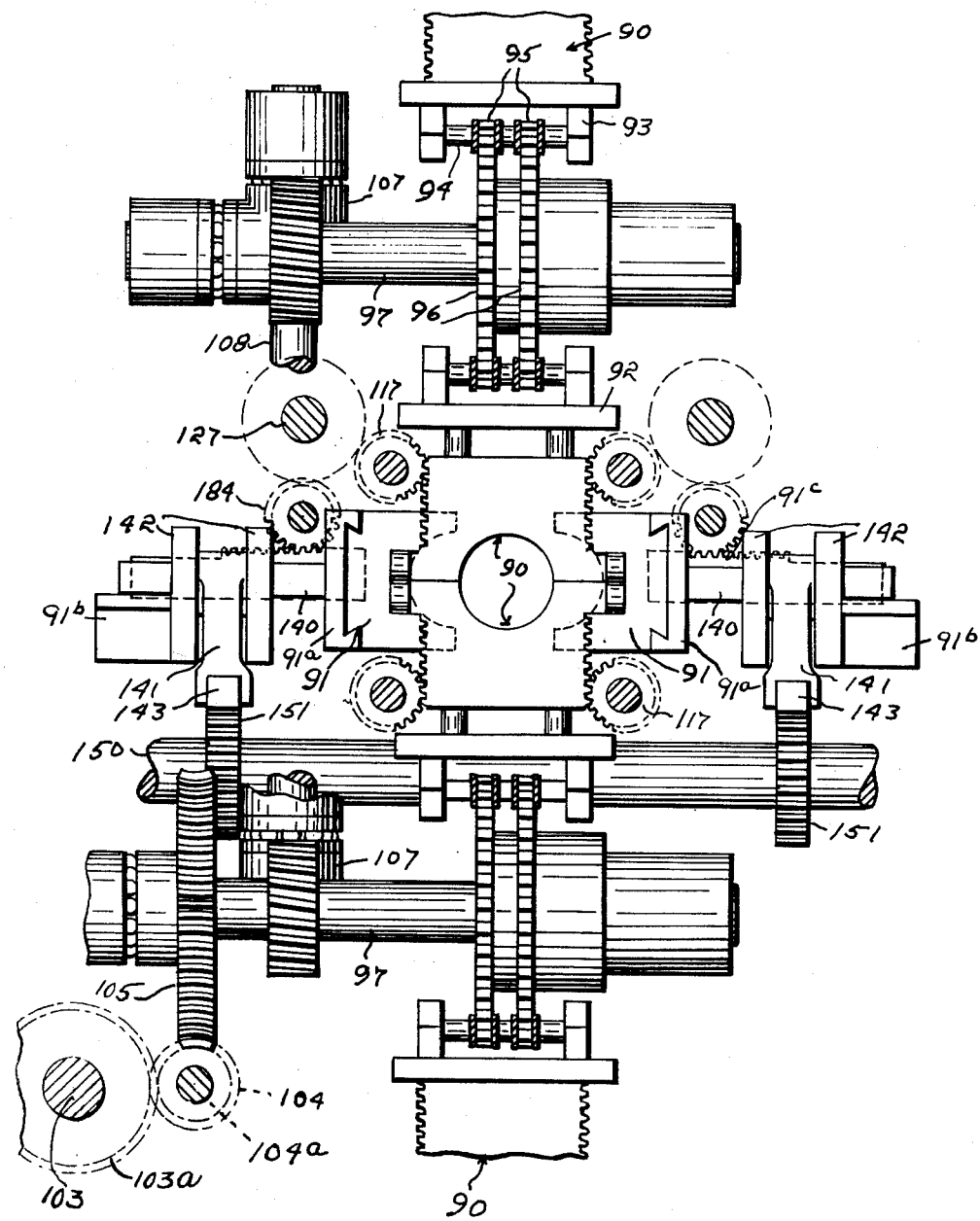

Dec. 30, 1958  P. C. HOLTE  2,866,230
CORRUGATED RUBBER TUBING AND ITS PRODUCTION
Filed Feb. 24, 1956  13 Sheets-Sheet 8

Inventor:
Paul C. Holte,
by
Attorney

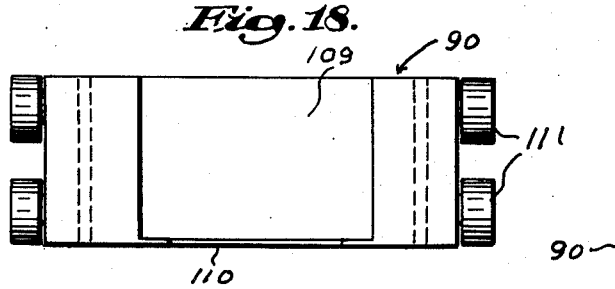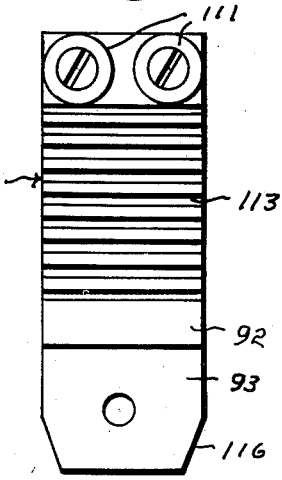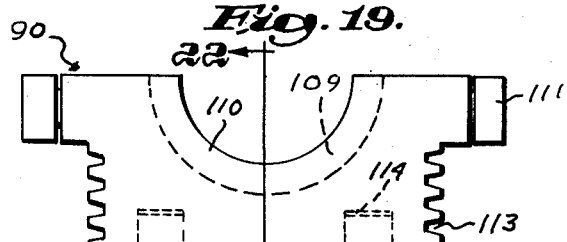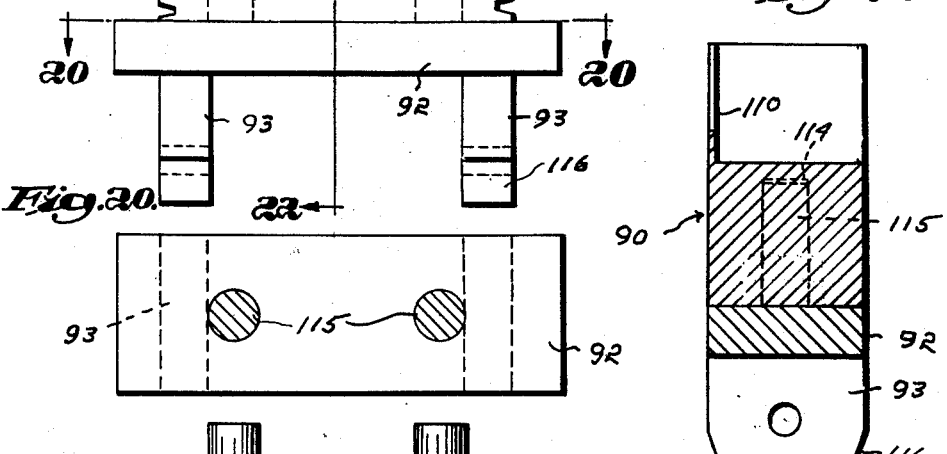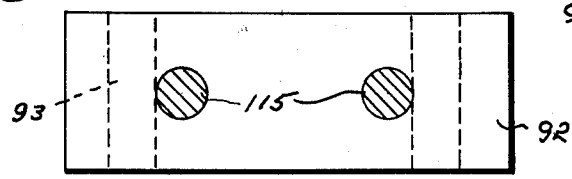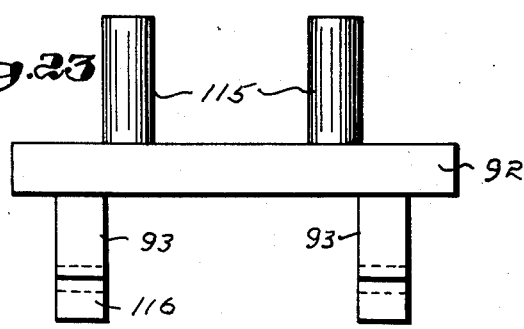

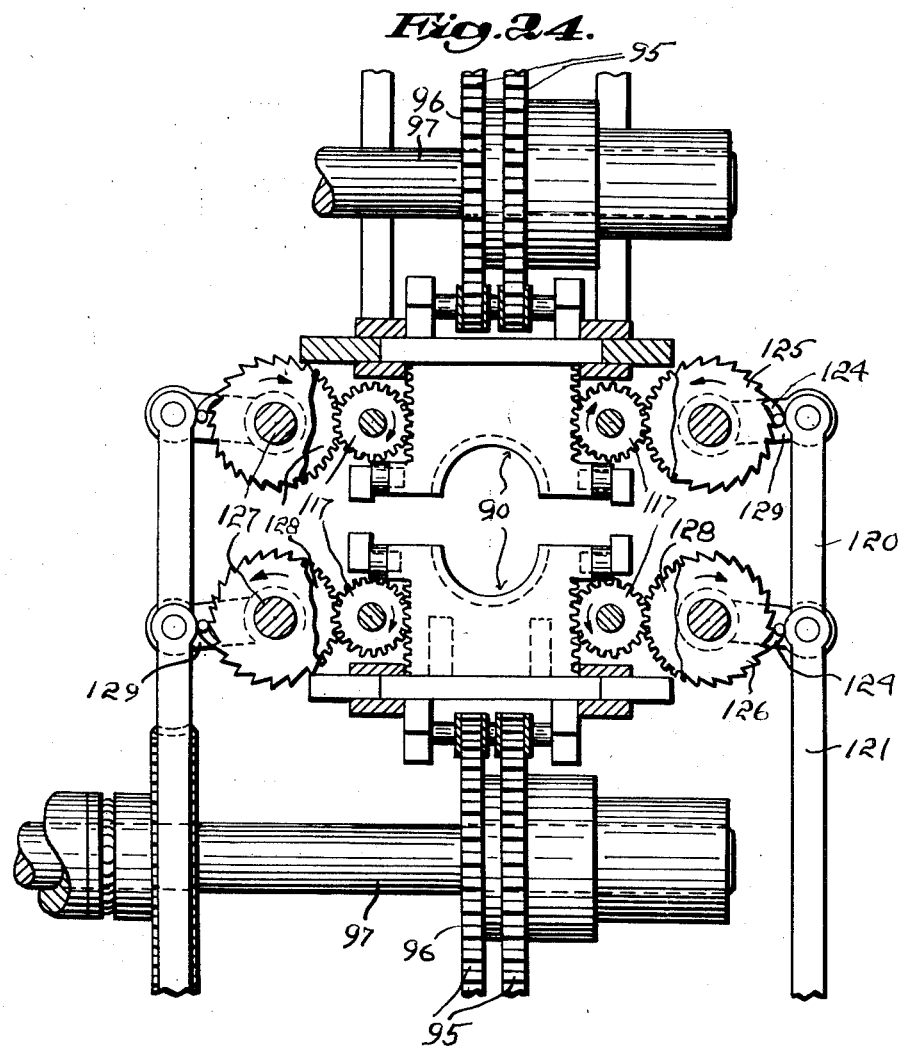

Dec. 30, 1958 P. C. HOLTE 2,866,230
CORRUGATED RUBBER TUBING AND ITS PRODUCTION
Filed Feb. 24, 1956 13 Sheets-Sheet 11

Inventor:
Paul C. Holte,
by Abbott Spear,
Attorney

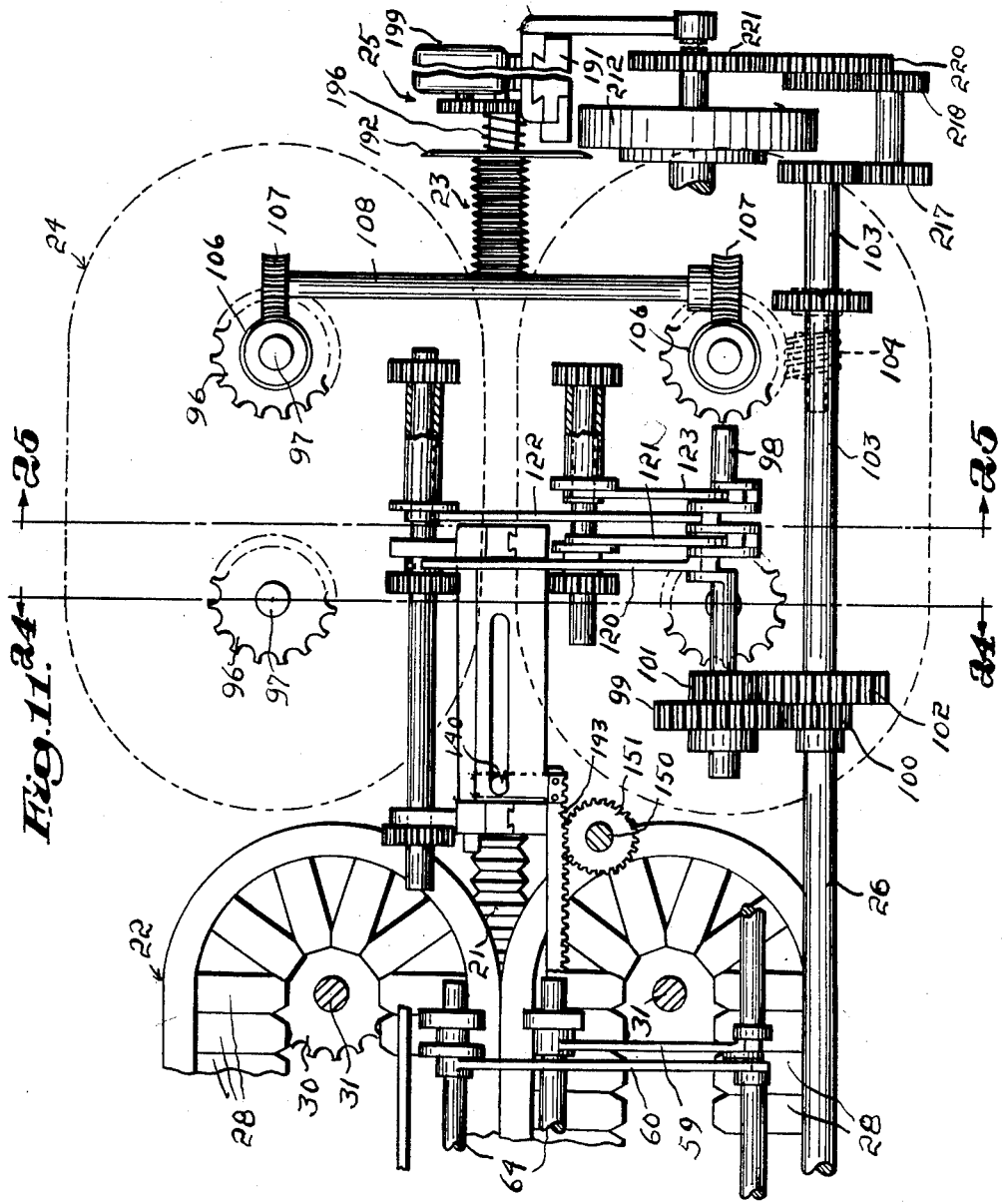

Dec. 30, 1958 P. C. HOLTE 2,866,230
CORRUGATED RUBBER TUBING AND ITS PRODUCTION
Filed Feb. 24, 1956 13 Sheets-Sheet 13
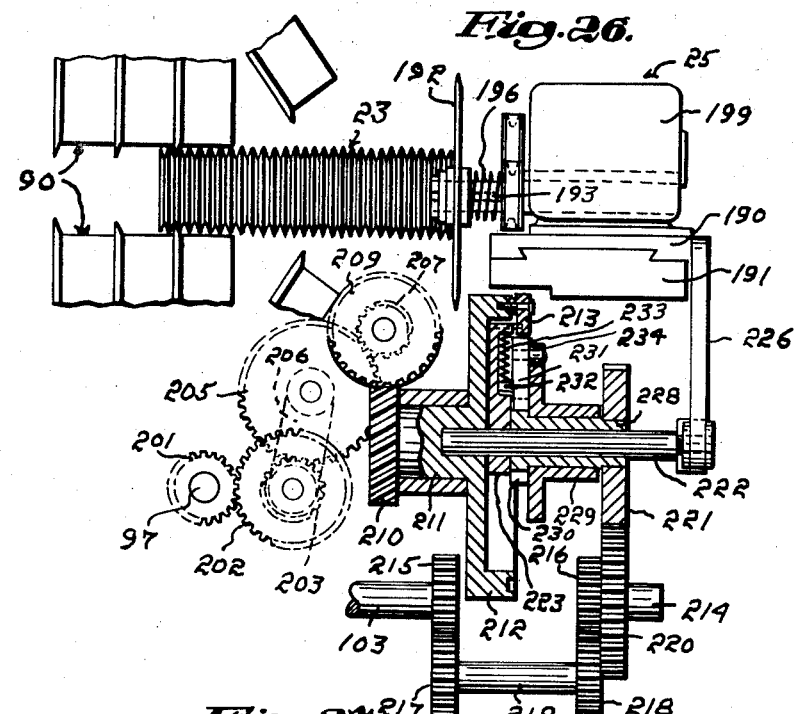
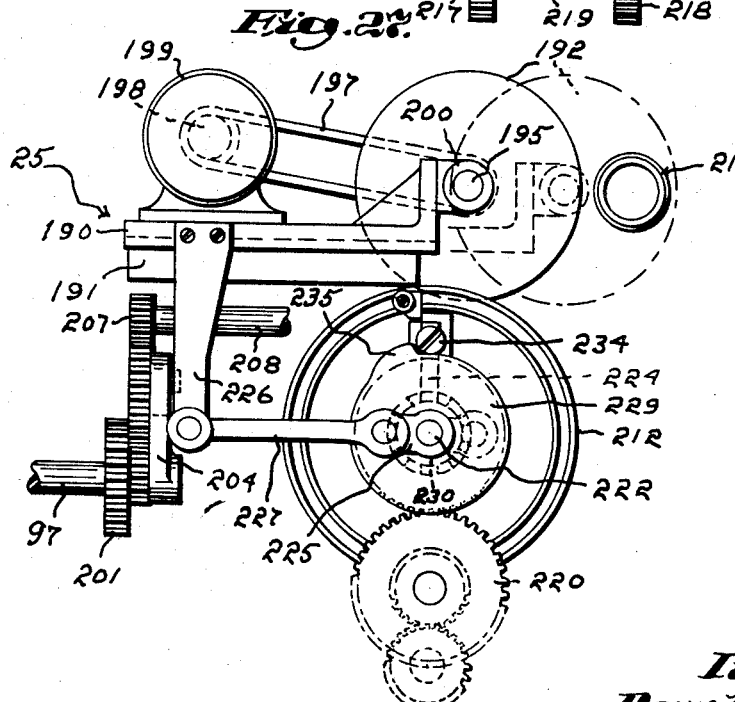
Inventor:
Paul C. Holte,
by Attorney United States Patent Office 2,866,230
Patented Dec. 30, 1958

2,866,230

CORRUGATED RUBBER TUBING AND ITS PRODUCTION

Paul C. Holte, Weymouth, Mass., assignor to Pullman Vacuum Cleaner Corporation, Boston, Mass., a corporation of Massachusetts Application February 24, 1956, Serial No. 567,653

15 Claims. (Cl. 18—19)

The present invention relates to apparatus for use in corrugating uncured rubber tubing.

In order that uncured rubber tubing may be corrugated most advantageously, it should be treated while being conveyed thus to enable corrugations to be formed as a continuous process, preferably as the tubing comes from the extruder.

In accordance with the invention, the uncured rubber tubing has the corrugations partly formed therein as it is being conveyed and supported by a preformer. The preformed corrugations are then fully formed by axially compressing them together while the tubing is being conveyed and supported by a stacker. The stacker preferably receives the tubing directly and continuously from the preformer. The stacked tubing is then readied for curing as by cutting it into desired lengths.

In the accompanying drawings, there is shown an illustrative embodiment of the invention from which these and other of its objectives, novel features, and advantages will be readily apparent.

In the drawings:

Fig. 1 is a partly sectioned side view of the preformer,

Fig. 2 is a view of the preformer as seen from the infeed end thereof,

Figure 3:
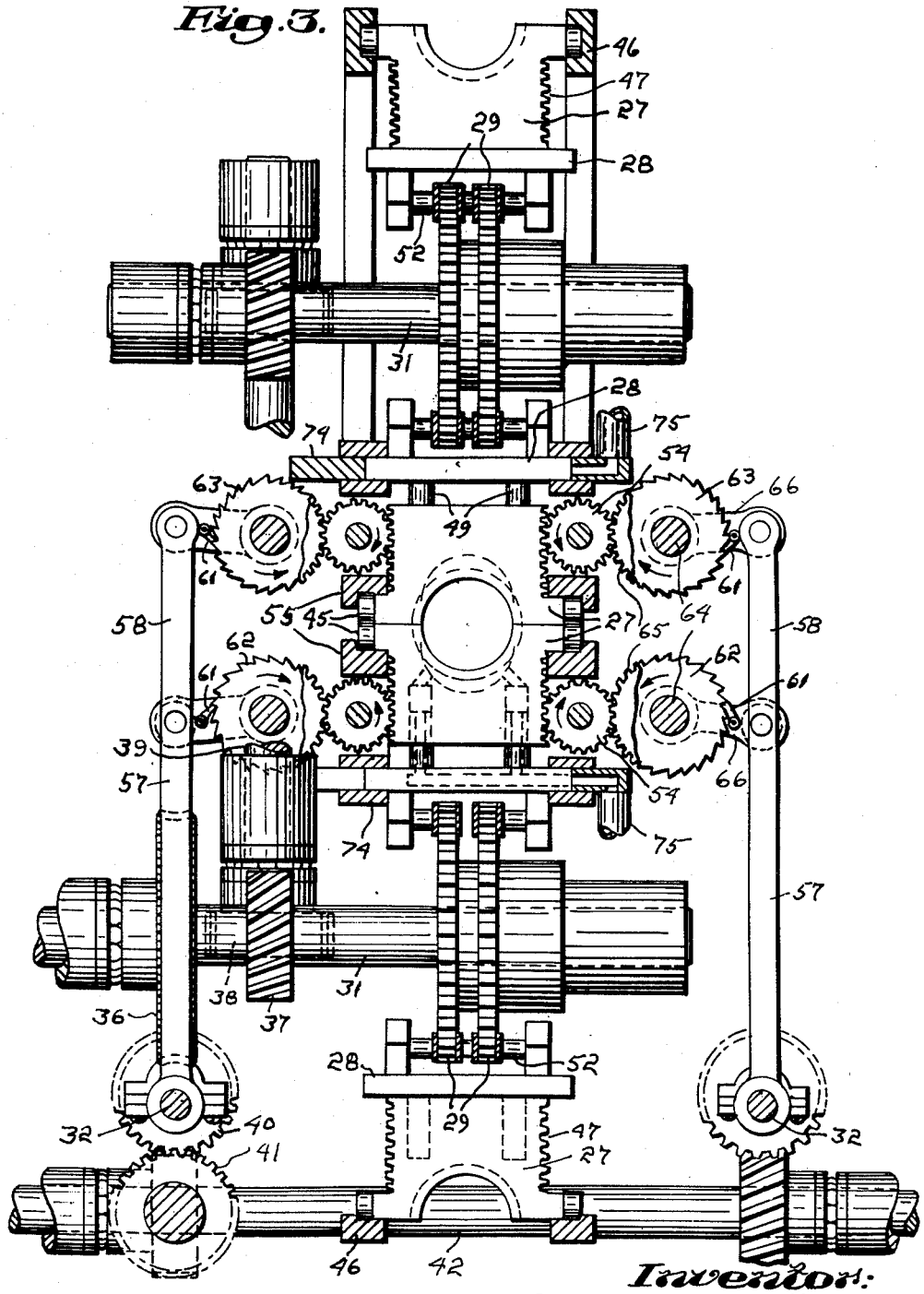
Figure 10:
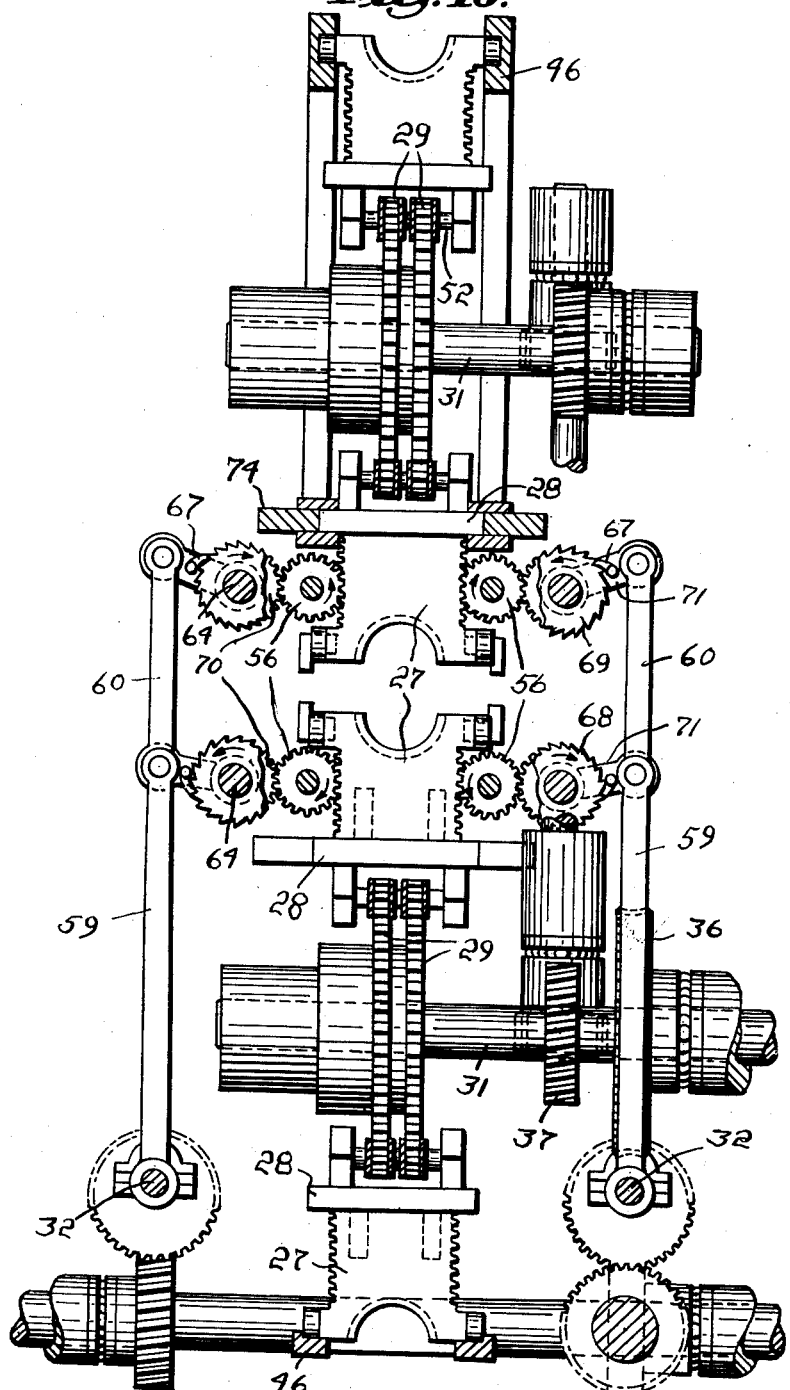
Figure 15:
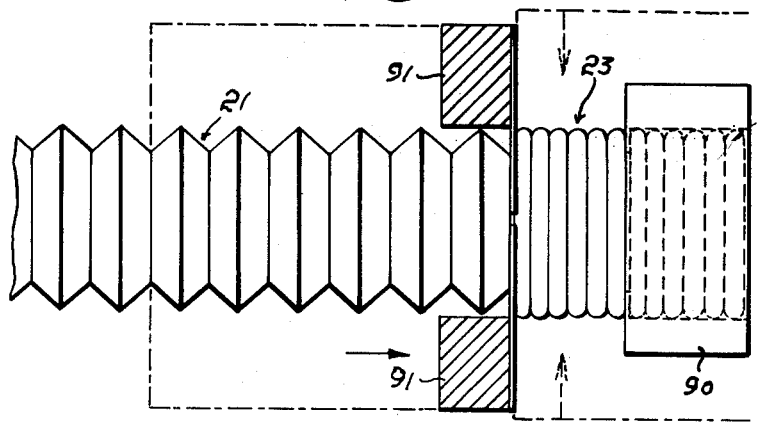
Figure 16:
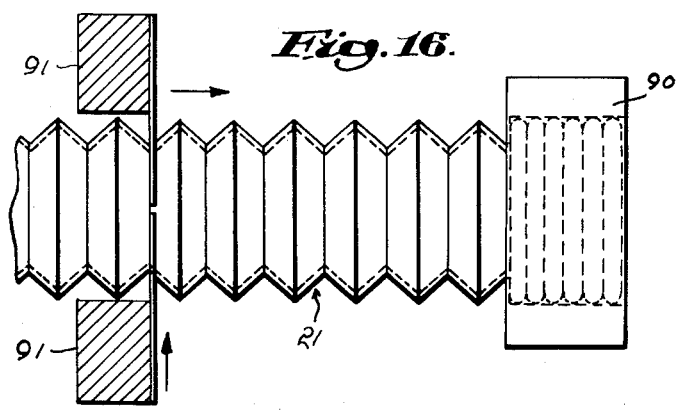
Figure 17:
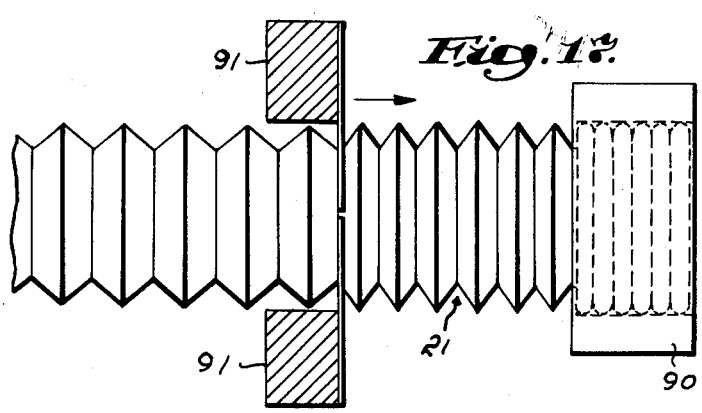
Figure 25:
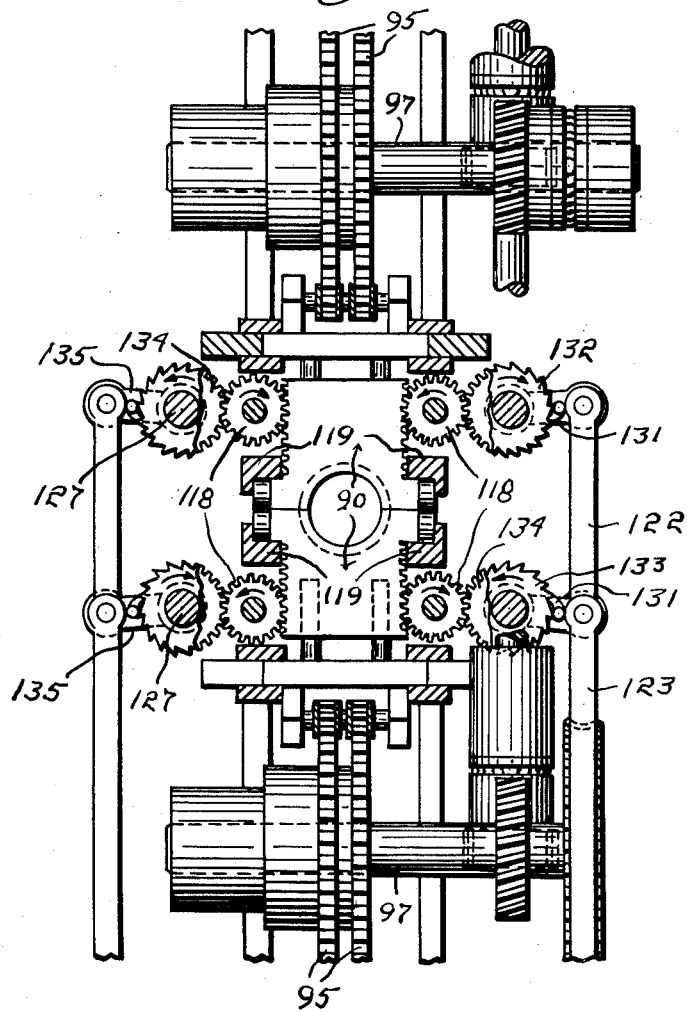

Fig. 3 is a section, on an increased scale, taken approximately along the indicated lines 3—3 of Fig. 1, Fig. 4 is a view of a die, showing its tubing contacting face, Fig. 5 is a section of the die taken along the indicated lines 5—5 of Fig. 4, showing it assembled on its mount, Figs. 6 and 7 are plan and side views, respectively, of a die mount, Fig. 8 is an edge view of a die and its mount, Fig. 9 is a section of the die and mount taken along the indicated lines 9—9 of Fig. 4, Fig. 10 is a fragmentary section taken along the generally indicated lines 10—10 of Fig. 1, Fig. 11 is a partly sectioned and fragmentary somewhat schematic view showing the preformer, the stacker, and the cutter, Fig. 12 is a fragmentary side view, on an increased scale, of the infeed end of the stacker, Fig. 13 is a partly sectioned end view of the portions of the stacker important in the stacking stroke, Fig. 14 is a generally similar view illustrating the coaction of the parts of the stacker, important in moving the stacking fingers into and out of engagement with the tubing, Fig. 15 is a somewhat schematic view illustrating the stacking fingers completing a stacking stroke, Fig. 16 is a like view showing the commencement of a stacking stroke, Fig. 17 shows the stacking finger in an intermediate position, Fig. 18 is a plan view of a stacking die, Fig. 19 is a rear end view thereof, Fig. 20 is a section taken along the indicated lines 20—20 of Fig. 19, Fig. 21 is a side view of a die, Fig. 22 is a section taken along the indicated lines 22—22 of Fig. 19, Fig. 23 is an elevation of a mount for a stacking die, Fig. 24 is a section, on an increased scale, taken approximately along the indicated lines 24—24 of Fig. 11, Fig. 25 is a similar section taken along the indicated lines 25—25 of Fig. 11, Fig. 26 is a partly sectioned side view of the cutter, and Fig. 27 is a view of the cutter as seen from the outfeed end thereof.

It will be understood that the invention is particularly concerned with the corrugation of tubing of uncured rubber, particularly as it comes from the extruder, with the corrugations seated one against another thus to provide, after curing, hose that may be substantially extended and that returns readily to its compacted form.

In accordance with the invention, the uncured rubber tubing as it comes from an extruder is indicated at 20 and this is provided with corrugations 21 in the preformer 22. The preformed corrugations are then seated one against the other as indicated at 23 by the stacker, generally indicated at 24. Thereafter, the compact corrugated tubing 23 may be cut into desired lengths as by the cutter, generally indicated at 25. The units, 22, 24, and 25 are shown as arranged in a row each to be driven in timed relations as by the common drive shaft 26. In order to ensure timing of the apparatus with the output of the tubing by the extruder, the shaft 26 has a variable drive, not shown, which may be of any conventional type. It will be apparent that in the event that a separate drive is provided for each unit, such drives must be carefully timed relative to each other. In the drawings, frame work, bases and other unimportant or conventional parts and structures have not been shown to simplify the disclosures.

The preformer 22 is provided with upper and lower sets of dies generally indicated at 27 with each die including a mount 28 pivotally attached to an endless conveyor. Preferably, each conveyor comprises a pair of chains 29 trained over sprockets 30 carried by transversely disposed shafts 31 with the shafts for each conveyor being horizontally alined.

On each side of the preformer 22 there is a crank shaft 32, one provided with a gear 33 meshing with a gear 36 on one of the lower pair of shafts 31. The last-mentioned shaft 31 and the corresponding shaft of the upper pair have gears 37 meshing with respective ones of the gears 38 on the vertically disposed shaft 39. The two crank shafts 32 also have gears 40 meshing with suitable gears 41 on the transverse shaft 42.

From the foregoing, it will be apparent that both the upper and lower conveyors and the two crank shafts 32 are driven in predetermined relation to each other with the dies moving at the speed of the tubing 20. It will be appreciated that the tubing 20, being uncured, requires support and such is indicated only by the grooved idler 43, see Fig. 1, although, in practice, supporting structure is employed wherever necessary.

Both sets of dies 27, see Figs. 4-9, have their tubing-contacting faces of semi-circular form (where the tubing is to be circular in cross section) and provided with annularly disposed recesses 44 shown as V-shaped for forming the V-shaped corrugations 21 in the tubing 20. Each die carries laterally projecting rollers 45 for engagement with the track 46 (see Figs. 1-3). Each track 46 terminates in a zone beyond the infeed end of the preformer 22 as defined by the proximate courses of the conveyors and commences just short of the outfeed end thereof. It will be noted that the tracks 46 are so spaced that the dies are held thereby from contact with the tubing 20, in the infeed and outfeed zones of the preformer.

In order for the dies to preform corrugations in the tubing 20, it is necessary to provide means for closing them together between the ends of the tracks 46 and then spacing them apart for reengagement with said tracks. To accomplish such closing and opening of pairs of dies, one from each set, each die has its sides formed with a rack portion 47 and its end, opposite its tubing-contacting face, bored as at 48 to slidably receive pins 49 projecting from its mount 28. The die mounts each have spaced lugs 50 apertured as at 51 to receive pivots 52 by which the mounts are attached to their respective chains 29. It will be noted that the dies and mounts are secured to the chains in abutting relationship to avoid gaps in corrugating the tubing 20. In order that the mounts be held steady as they course about respective ones of the sprockets 30, their proximate faces are beveled as at 53.

Located at the infeed end of the preformer 22 in the zone where the proximate ends of the tracks 46 terminate, there are mounted gears 54, see Fig. 3, one for each side of the upper set of dies and one for each side of the lower set thereof. These are disposed, see Figs. 2 and 3, so that each engages, as a spline, an appropriate one of the rack surfaces 47 of a die 27 before it becomes disengaged from its track 46 and these gears are intermittently rotated to feed each die into engagement with the tubing 20 with its rollers travelling in engagement with the holding track 55, see Fig. 3.

Similarly arranged pinion gears 56, see Fig. 10, are located at the outfeed end of the preformer 22 in the zone where the proximate end of the tracks 46 commences. The gears 56 are disposed so that each engages, as a spline, an appropriate rack surface 47 of a die 27 moving in contact with the tubing 20 and these gears are so intermittently rotated as to feed each die out of engagement with the tubing 20 and its rollers out of engagement with its holding track 56 and into a position for reengagement with the appropriate one of the tracks 46.

In order to suitably rotate the pinions 54 and 55, each crank shaft 32 is furnished with two pairs of vertically arranged cranks 57 and 58, and 59 and 60. The cranks 57 and 58 as may best be seen in Fig. 3, are effective to actuate pawls 61, thus to rotate ratchet wheels 62 and 63 respectively, equally but oppositely. Each ratchet wheel 62, 63 is rotatably mounted on a shaft 64 and includes a gear 65 meshing with a pinion 54. The pawls 61 are pivotally carried by links 66 rotatably mounted on respective ones of the shafts 64 and pivotally connected to the upper end of the appropriate crank as may be best seen in Fig. 3.

The cranks 59 and 60, as may best be seen in Fig. 10, are effective to actuate pawls 67 thus to rotate ratchet wheels 68 and 69, equally but oppositely, thus to spread the dies apart. Each ratchet wheel 68 and 69 is rotatably supported by the shaft 64 and includes a gear 70 meshing with a pinion 56. The pawls 67 are carried by links 71 rotatably mounted on respective ones of the shafts 64 and pivotally connected to the upper end of the appropriate crank 59, 60.

It will be appreciated that while the dies are unsupported by the track 46, both margins of their mounts 28 are entrant of channel members 74 of which one member supports the intake end of a conduit 75 from a vacuum pump or other suitable source of suction.

The corresponding margin of each mount 28 has a bore 76 in communication with bores 77 extending through each of its pins 49. Each bore 48 of the dies has an extension 78. In practice, the work contacting V-shaped recesses 44 of each die are established by an insert 79 fitted into an appropriately shaped part of each die 27. Bores 80 in each recess 44 communicate with passageways 81 established by the proximate faces of the inserts 79 and the corresponding parts of each of their dies and these are connected together, as by branches 82, and to the bore extensions 78. By this arrangement, whenever the dies are closed about the tubing 20, suction is exerted against its periphery ensuring correct formation of corrugations in the tubing. This arrangement also ensures that whenever suction is applied to one of two dies that are closed together about the tubing, it is also effective as to the other of said dies.

The tubing leaving the preformer now passes to the stacker 24 where it is to be received between respective ones of the upper and lower series of generally indicated containing and conveying dies 90 after a plurality of preformed corrugations have been stacked or compressed together by the pair of fingers 91.

Each die 90 is generally similar to the dies 27. The dies 90 as may be best seen in Figs. 18-23, are provided with mounts 92 shown as having spaced lugs 93 for the pivots 94 by which the dies are attached to endless conveyors each shown as consisting of a pair of chains 95, see Fig. 14. The chains 95 are trained over sprockets 96 carried by transversely disposed shafts 97 with the shafts for each of the conveyors being horizontally alined.

On each side of the stacker 24 there is a crank shaft 98 of which one is provided with a gear 99 meshing with gear 100 fast on the drive shaft 26. This same crank shaft is also provided with a gear 101 meshing with the gear 102 on the drive shaft extension 103 which is thereby driven at a suitably reduced rate. The shaft extension 103 drives the worm gear 104 through meshing spur gears 103a and 104a and the gear 104 meshes with the gear 105 carried by one of the shafts 97 of the lowermost pair thereof. This same shaft 97 and the corresponding shaft 97 of the uppermost pair thereof have helical gears 106 meshing with gears 107 on the vertically disposed shaft 108 thereby to drive the upper and lower conveyors for the dies 90 at a suitably reduced rate. Both sets of dies 90 are shown as having their tubing-contacting faces defining a semi-circular cavity 109 dimensioned to the outside dimensions of fully compacted tubing and of a length to accommodate a predetermined number of fully formed and compacted corrugations. Each face of a die 90 also has a shoulder 110 at its trailing edge and dimensioned to enter between a pair of preformed tubing corrugations and to define, with the corresponding shoulder of a die of the other series, an aperture whose diameter is equal to that of the tubing between a pair of said corrugations.

Each die 90 carries laterally projecting rollers 111 for engagement with the track 112. Each track 112 terminates in a zone beyond the infeed end of the stacker 24 as defined by the proximate courses of the stacker conveyor and commences just short of the outfeed end thereof.

It will be noted that the tracks 112 are so spaced that the dies 90 are held thereby from contact with the tubing with its preformed corrugations 21. In order for the dies to perform holding and conveying functions, it is necessary to provide means for closing them together, when disengaged from the track 112, and then spacing them apart for re-engagement therewith. Each die has its sides formed with rack portions 113 and its end bored at 114 to slidably receive pins 115 projecting from its mount 92. Like the mounts 28, and for the same reason, the lugs 83 are beveled as at 116.

At the end of the track 112 that is proximate to the infeed end of the stacker 24, there are pinions 117, see Fig. 24, one for the rack portions 113 of the upper series of dies and one for the rack portions 113 of the lower series of dies 90. The pinions 117 serve as splines and are intermittently rotated to bring the dies 90 together around the stacked tubing and adjacent the outfeed end of the stacker 24 there are similarly arranged pinions 118, see Fig. 25, for the upper and lower series of dies serving as splines and intermittently rotated to space the dies 90 apart for re-engagement with their respective tracks 112. In between, the dies of both the upper and lower sets are held against movement relative to their mounts by tracks 119.

Each crank shaft 98 is furnished with two pairs of vertically arranged cranks 120 and 121 and 122 and 123. The cranks 120 and 121, see Fig. 24, are effective to actuate pawls 124 thus to rotate ratchet wheels 125 and 126, respectively, equally but oppositely. Each ratchet wheel 125 and 126 is rotatable on a shaft 127 and has a gear 128 meshing with a pinion 117. The pawls 124 are pivotally carried by links 129 rotatably mounted on respective ones of the shaft 127 and pivotally connected to the upper end of the appropriate crank.

The cranks 122 and 123, see Fig. 25, are effective to actuate pawls 131 thus to rotate ratchet wheels 132 and 133 equally but oppositely. Each ratchet wheel 132, 133 is rotatable on a shaft 127 and also is provided with a gear 134 meshing with a pinion 118. The pawls 131 are carried by links 135 rotatably mounted on respective ones of the shafts 127 and pivotally connected to the upper end of the appropriate crank 122, 123.

By these means, the corresponding dies of the upper and lower sets thereof are brought into and out of coacting relationship thus to provide means for confining, supporting, and conveying the stacked tubing to the cutter 25, and the mechanism by which the preformed corrugations are completed, before such confining, supporting and conveying, by stacking and pressing them together will now be described.

It will be noted that the fingers 91 are shown as having semi-circular, opposed recesses and these are movable towards and away from each other and forwardly and rearwardly in a horizontal plane thus to be able to move together to provide an encircling grip for the tubing between two of its preformed corrugations, advance a series of them axially to compress them between it and the shoulder 110 of a pair of engaged dies, move apart to release the thus compressed length of tubing, and then to return to their original position.

The fingers 91 are each provided with a transversely disposed stem 140 transversely slidable in a mount 141 and supported between longitudinally slotted slideway members 142 for fore and aft movement relative to the infeed end of the stacker. Each mount 141 has a rack 143 yieldably urged towards a starting position by a spring 144.

Assuming the fingers 91 to be in their starting positions and closed together about the tubing with the preformed corrugations 21 as shown in Fig. 15, the mechanism for advancing them through a compacting stroke will be first considered. It will be noted that the drive shaft 26 has a gear 145 meshing with gear 146 on the transverse shaft 147 carrying the gear 145 meshing with gear 146 on the transverse shaft 147 carrying the gear 148 meshing with the gear 149 rotatable on the rotatable hub 150 provided with pinions 151, one for each rack 143, see Figs. 12 and 13.

Gear 149 is provided with a radially movable dog 152 under the control of the engaging spring 153 and adapted to engage the shoulder 154 of the clutch 155 fast on the hub 150. When the shoulder is thus engaged by the dog 152, the hub 150 rotates with gear 149 thus to effect movement of the racks 143 until the dog 152 is disengaged from the clutch shoulder 154 by the stationary cam 156 adjustable relative to its part 157 by means of the locking screw 158 located in the slot 159 arcuate with respect to the axis of the hub 150.

While the above described means are operative to actuate the racks 143 to provide a suitable stacking stroke, it is desirable to provide an interval in which the racks 143 are held against return by the springs 144 until a pair of holding dies 90 is closed together about the preformed tubing 21.

To accomplish this, there is shown a cam 160 secured to the gear 149 operative to engage the roller 161 on one end of a pivoted pawl 162 yieldably backed by the spring 163. The cam 160 thus forces the teeth 164 and 165 of the pawl into holding engagement with the ratchet wheel 166 for the predetermined interval said cam represents. The pawl teeth 164 and 165 are yieldably biased by springs 167 and 168, respectively. The ratchet wheel 166 and the gear 169, which meshes with gear 170 fast on the hub 150, rotate together. By these means the cam portion 161 is operative to effect a holding engagement with the pawl of the ratchet 161 and, accordingly, the hub 150.

Before the fingers 91 can be released for return under the action of the spring 144 and while they are held against such return by the cam 160, they must be disengaged from each other and from the tubing. In this connection, it will be noted that each finger 91 is slidable in guideway 91ª that is also slotted to receive a stem 140 and that is slidable in a transverse way 91ᵇ. Beyond the infeed ends of the members 142, the ways 91ᵇ each have a laterally projecting rack 91ᶜ.

By this arrangement, the fingers 91 which are movable in parallel with the axis of the tubing, may be moved inwardly and outwardly relative thereto by means in control of the racks 91ᶜ. Such means are shown as including gears 171 and 172 mounted to rotate together on the stud 173. The gear 171 meshes with the gear 149 and the gear 172 meshes with the gear 174 on the shaft 175. The gear 171 has its teeth confined to only a portion of its periphery thereby to effect the intermittent rotation of the cam 176 fast on the shaft 175.

The cam 176 is formed with a cam track, generally indicated at 177, for the roller 179 on the vertically movable slide 180 which is provided with a rack 181. In Fig. 12, the roller 179 is shown as in the cam track zone 177ª shaped to provide a dwell with the fingers 91 closed. In the zone 177ᵇ of the cam track, the fingers are opened with a dwell being established in the track zone 177ᶜ due to the intermittent rotation of the cam 176. In the cam track zone 177ᵈ, the fingers are closed about the tubing.

The rack 181 meshes with gear segment 182 on one of the shafts 127 which has a gear 183 meshing with a pinion 184 for one of the finger positioning racks 91ᶜ. The fingers 91 are shown as having overlapping rack portions 185 both meshing with a pinion 186 whereby movement of one finger 91 is attended by equal but opposite movement of the other finger 91. Downward and upward movement of the rack 181 is thus effective to cause the fingers 91 to move into and out of engagement with the tubing.

By these or equivalent means, the fingers 91 are spaced apart for their return to their position at the start of a stacking stroke, held apart during such return by the springs 143 and then closed together against the tubing for another stacking stroke in which position they remain until that stroke is completed, and a pair of dies 90 is closed about that stacked portion.

The axially compressed or stacked tubing is now ready to be vulcanized and for this purpose and for general convenience, it is usually found desirable to cut the stacked tubing into desired lengths as it leaves the stacker 24.

In Figs. 26 and 27 a suitable form of cutter 25 is detailed. A mount 190 is reciprocable on its slideway 191 to carry the rotary knife into and out of the path of the tubing 21 as it comes from the stacker. The knife 192 is slidably splined as at 193 to the shaft 195 with slidable movement therealong being yieldably opposed by the spring 196. Shaft 195 is rotatably driven by the belt 197 connecting the pulley 198 of the motor 199 and the shaft pulley 200.

A gear 201 is carried by the drive shaft 97 with which the gear 202 meshes. Rotatable with the gear 202 is a gear 203 carried by the mount 204 and meshing with the idler 205 anchored in the slideway 206 of the mount 204 for convenience in the event the ratio is to be changed as in cutting longer or shorter pieces of tubing 23. The idler 205 meshes with the gear 207 of the shaft 208. Fast on the shaft 208 is a gear 209 meshing with the gear 210 on the stub 211 of the rotatable plate 212 provided with a dog 213.

The drive shaft extension 103 and the stub shaft 214 have gears 215 and 216, respectively, meshing with idlers 217 and 218 on the idler shaft 219. Stub shaft 214 is also provided with a gear 220 meshing with the gear 221 on the shaft 222 but rotatable independently thereof. The shaft 222 is also rotatable independently of the dog plate 212 which receives the element 223 provided with a radial slot 224 and fast on the shaft 222 to whose exposed end there is attached a crank 225 connected to the arm 226 of the mount 190 by the connecting rod 227.

The gear 221 has a sleeve 228 rotatable in a fixed cam 229 and provided with a gear 230 adapted to receive the clutch element 231 which coacts therewith and is provided with a part 232 slidable in the radial slot 224 and urged in engaging position by the spring 233. The clutch element 231 is provided with a cam engaging roller 234.

When the roller 234 is in its position shown in the drawings, the element 231 is engaged with the gear 230 thereby connecting the shaft 222 to the gear 221 to reciprocate the knife into and out of its operative position. As the inoperative position of the knife is approached, the roller 234 rides up on the cam projection 235 withdrawing the element 231 from clutching engagement with the gear 230 until rotation of the dog plate 212 brings the dog 213 again into contact with the roller 234 which is now positioned to be engaged and dislodged thereby, thus to initiate another cutting stroke. The rate of rotation of the dog plate 212 thus determines the length of the tubing that will be cut and this may be varied to meet requirements. Variations may also be effected by providing plates with a plurality of spaced dogs similar to the dog 213.

While the operation of the invention has been described in some detail with reference to the apparatus herein described, a discussion of the method will prove to be of assistance in this respect.

It will be noted that tubing, as it comes from the extruder, has dies closed around it to preform corrugations and that these dies serve to support and convey that tubing. The preformed tubing then has its corrugations pressed one against another against a moving stop established by a second series of conveying and supporting dies that are securely closed about it to hold their form and to support and carry them to the cutter. From the cutter, the tubing is conveyed to the vulcanizing station firmly supported in its stacked state.

It will be thus apparent that the invention is well adapted to meet production requirements for the most advantageous production of corrugated rubber tubing.

What I therefore claim and desire to secure by Letters Patent is:

1. Apparatus for corrugating uncured rubber tubing comprising means to convey tubing at a predetermined rate and to support it for a predetermined distance and to preform corrugations therein during said distance, means to convey said tubing in the same direction but at a reduced rate and including a plurality of stops moving at said reduced rate, and means to axially compress a plurality of preformed corrugations against each of said stops.

2. Apparatus for corrugating uncured rubber tubing comprising means to convey tubing at a predetermined rate and to preform corrugations therein, means to convey said tubing in the same direction but at a reduced rate and including a plurality of stops moving at said reduced rate, and means to axially compress a plurality of preformed corrugations, against said stops to complete a section, each stop including portions housing a previously compressed section and engaging the rearmost corrugation thereof.

3. In apparatus for forming corrugations in uncured rubber tubing, a pair of conveyors spaced to receive the tubing freely between them and driven with their proximate courses moving in the same direction, a series of elements carried by each conveyor and movable towards and away from the elements of the other conveyor, each element having a semi-circular chamber and a trailing shoulder, and means in control of both series of elements and operable to bring corresponding ones of both series into engagement for a predetermined length of travel, said semi-circular chamber being dimensioned to the outside diameter of the corrugated tubing and said trailing shoulders being dimensioned to engage therewith.

4. In apparatus for corrugating uncured rubber tubing, a pair of conveyors disposed and driven with their proximate courses travelling in the same direction and defining a free pathway for said tubing, a series of elements for each conveyor, each element including a mount attached to a conveyor and a member slidably connected thereto for movement between an inoperative position and an operative position in which it engages said tubing and the corresponding member of the other series of elements, holding means for said members having its ends so located that said members are inoperatively positioned except when they are travelling along said proximate courses, and intermittently operated means located proximate to the ends of said holding means to receive from one end thereof a corresponding member of each series and to step it into engagement with said tubing and each other and to separate a pair of corresponding members and to position each for engagement with the other ends of said holding means.

5. In apparatus for corrugating uncured rubber tubing, a pair of conveyors disposed and driven with their proximate courses travelling in the same direction and defining a free pathway for said tubing, a series of elements for each conveyor, each element including a mount attached to a conveyor and a member slidably connected thereto for movement between an inoperative position and an operative position in which it engages said tubing and the corresponding member of the other series of elements, each member including a rack on at least one of its side edges, holding means for said members having its ends so located that said members are inoperatively positioned except when they are travelling along said proximate courses, and gears proximate the ends of said holding means for meshing as splines with racks of members received therefrom and with the racks of members to be returned to the opposite ends thereof and means timed with the travel of the conveyors to step said gears to move a splined member into engagement with said tubing and each other and to separate a pair of corresponding members and to position them for re-engagement with the other ends of said holding means.

6. In apparatus for corrugating uncured rubber tubing, a pair of conveyors disposed and driven with their proximate courses travelling in the same direction and defining a free pathway for said tubing, a series of elements for each conveyor, each element including a mount attached to a conveyor and a member slidably connected thereto for movement between an inoperative position and an operative position in which it engages said tubing and the corresponding member of the other series of elements, each member including a rack on at least one of its side edges, holding means for said members having its ends so located that said members are inoperatively positioned except when they are travelling along said proximate courses, and gears proximate the ends of said holding means for meshing as splines with racks of members received therefrom and with racks of members to be returned to the opposite ends thereof and crank operated means including pawl and ratchet connections with said gears operative to step said gears to move a splined member into engagement with said tubing and each other and to separate a pair of corresponding members and to position them for re-engagement with the other ends of said holding means.

7. In apparatus for corrugating uncured rubber tubing, a pair of conveyors disposed and driven with their proximate courses travelling in the same direction and defining a free pathway for said tubing, a series of elements for each conveyor, each element including a mount attached to a conveyor, for edge-to-edge engagement with other mounts along a proximate course and a member slidably connected thereto for movement between an inoperative position and an operative position in which it engages said tubing and the corresponding member of the other series of elements, an open-ended suction chamber for each conveyor dimensioned to receive and be closed by said mounts, said mounts and said members having interconnected conduits effecting communication between said chambers and the tubing-contacting faces of said members, holding means for said members having its ends so located that said chamber is between them and that said members are inoperatively positioned except when they are travelling along said proximate courses, and intermittently operated means located proximate to the ends of said holding means to receive from one end thereof a corresponding member of each series and to step them into engagement with said tubing and each other and to separate a pair of corresponding members and to position them for engagement with the other ends of said holding means.

8. In apparatus for corrugating uncured rubber tubing, a pair of conveyors disposed and driven with their proximate courses travelling in the same direction and defining a free pathway for said tubing, a series of elements for each conveyor, each element including a mount attached to a conveyor and a member slidably connected thereto for movement between an inoperative position and an operative position in which it engages said tubing and the corresponding member of the other series of elements, holding means for said members having its ends so located that said members are inoperatively positioned except when they are travelling along said proximate courses, and intermittently operated means located proximate to the ends of said holding means to receive from one end thereof a corresponding member of each series and to step them into engagement with said tubing and each other and to separate a pair of corresponding members and to position them for engagement with the other ends of said holding means, the proximate faces of corresponding members of the two series being shaped and dimensioned to provide, when the members are in contact, a trailing stop dimensioned to enter between any two corrugations and a main cavity dimensioned to receive a plurality of fully formed corrugations.

9. In apparatus for axially compressing uncured rubber tubing having partly formed corrugations, means defining a pathway for said tubing, a series of stops, means to introduce said stops successively into said pathway and to convey them therealong at a predetermined speed, compressing means movable axially in engagement with the tubing in the direction of said stops between first and second positions but at a speed greater than that of said stops, and means operative at the second position to disengage said compressing means from the tubing and to effect re-engagement thereof at said first position.

10. In apparatus for axially compressing uncured rubber tubing having partly formed corrugations, means defining a pathway for said tubing, a series of stops, means to introduce said stops successively into said pathway and to convey them therealong at a predetermined speed, a pair of fingers engageable in a first position with the trailing face of a partly formed corrugation, a drive advancing said fingers in the direction of said stops to a second position at a speed greater than that of said stops, resilient means to return said fingers from said second position to said first position, means operative at the second position to disengage said fingers from the tubing and to effect re-engagement thereof at said first position.

11. In apparatus for axially compressing uncured rubber tubing having partly formed corrugations, means defining a pathway for said tubing, a series of stops, means to introduce said stops successively into said pathway and to convey them therealong at a predetermined speed, a pair of fingers engageable in a first position with the trailing face of a partly formed corrugation, a drive for advancing said fingers in the direction of said stops to a second position at a speed greater than that of said stops, said drive including a single revolution clutch, a pinion rotatable therewith, and a rack movable with said fingers and in mesh with said pinion, resilient means to return said fingers from said second position to said first position when said clutch is disengaged and means operative at the second position to disengage said fingers from the tubing and to effect re-engagement thereof at said first position.

12. In apparatus for axially compressing uncured rubber tubing having partly formed corrugations, means defining a pathway for said tubing, a series of stops, means to introduce said stops successively into said pathway and to convey them therealong, a pair of fingers, a slideway supporting each finger for movement along said pathway between a first rearward position and a second position against a stop in said pathway, means supporting said slideways for movement laterally of said pathway, a drive including a connection with said fingers for moving them from said first to said second position, means to return said fingers from their second to their first positions, and a connection with said slideway supporting means operative to move said fingers apart in said second position and together in said first position.

13. In apparatus for axially compressing uncured rubber tubing having partly formed corrugations, means defining a pathway for said tubing, a series of tubing holding stops, means to introduce said stops successively into said pathway and to convey them therealong, a pair of tubing engaging and stacking fingers, a slideway supporting each finger for movement along said pathway between a first rearward position and a second position against a stop in said pathway, means supporting said slideway for movement laterally of said pathway, a drive including a connection with said fingers for moving them from said first to said second position and provided with a single revolution clutch, means to return said fingers from their second to their first position and a connection with said slideway supporting means operative to move said fingers apart in said second position and together in said first position, said first named connection including means preventing operation of said return means until another stop is introduced into said path in holding relation to the stacked corrugations engaged by said fingers.

14. In apparatus for axially compressing uncured rubber tubing having partly formed corrugations, means defining a pathway for said tubing, a series of tubing holding stops, means to introduce said stops successively into said pathway and to convey them therealong, a pair of tubing engaging and stacking fingers, a slideway supporting each finger for movement along said pathway between a first rearward position and a second position against a stop in said pathway, means supporting said slideway for movement laterally of said pathway, a drive including a connection with said fingers for moving them from said first to said second position, means to return said fingers from their second to their first position, and a connection with said slideway supporting means operative to move said fingers apart in said second position and together in said first position, said last named connection including an intermittently driven gear train including a cam and an intermittently driven rod and pinion connection with said slideways.

15. In apparatus for axially compressing uncured rubber tubing having partly formed corrugations, means defining a pathway for said tubing, a series of tubing holding stops, means to introduce said stops successively into said pathway and to convey them therealong, a pair of tubing engaging and stacking fingers, a slideway supporting each finger for movement along said pathway between a first rearward position and a second position against a stop in said pathway, each slideway including a rack, means supporting said slideways for movement laterally of said pathway, a drive including a connection with said fingers for moving them from said first to said second position, means to return said fingers from their second to their first positions, and a connection with said slideway racks to move said fingers apart in said second position and together in said first position, said last named connection including means imparting dwells at both of said positions.

References Cited in the file of this patent

UNITED STATES PATENTS

| | | |
|---|---|---|
| 1,264,506 | Haun | Apr. 30, 1918 |
| 2,075,735 | Loomis | Mar. 30, 1937 |
| 2,347,086 | Curtiss et al. | Apr. 18, 1944 |
| 2,513,777 | Andre | July 4, 1950 |
| 2,631,645 | Friedman | Mar. 17, 1953 |
| 2,712,157 | Holte | July 5, 1955 |